US011498344B2

(12) United States Patent
Wolff

(10) Patent No.: US 11,498,344 B2
(45) Date of Patent: Nov. 15, 2022

(54) APPARATUS AND METHOD FOR PRINTING LABELS

(71) Applicant: Espera-Werke GmbH, Duisburg (DE)

(72) Inventor: Peter Wolff, Swisttal-Heimerzheim (DE)

(73) Assignee: Espera-Werke GmbH, Duisburg (DE)

(*) Notice: Subject to any disclaimer, the term of this patent is extended or adjusted under 35 U.S.C. 154(b) by 0 days.

(21) Appl. No.: 16/956,626

(22) PCT Filed: Aug. 31, 2018

(86) PCT No.: PCT/EP2018/073432
§ 371 (c)(1),
(2) Date: Jun. 22, 2020

(87) PCT Pub. No.: WO2019/120646
PCT Pub. Date: Jun. 27, 2019

(65) Prior Publication Data

US 2020/0398592 A1 Dec. 24, 2020

(30) Foreign Application Priority Data

Dec. 22, 2017 (DE) ..................... 10 2017 131 052.5
Feb. 6, 2018 (DE) ..................... 10 2018 102 569.6

(51) Int. Cl.
*B32B 41/00* (2006.01)
*B41J 11/00* (2006.01)
(Continued)

(52) U.S. Cl.
CPC ......... *B41J 11/0095* (2013.01); *B41J 3/4075* (2013.01); *B65C 9/1865* (2013.01); *B65C 9/40* (2013.01); *B65C 9/46* (2013.01)

(58) Field of Classification Search
CPC ... B41J 11/0095; B41J 3/4075; B65C 9/1865; B65C 9/40; B65C 9/46
(Continued)

(56) References Cited

U.S. PATENT DOCUMENTS 4,667,208 A 5/1987 Shiraki et al.
5,466,079 A 11/1995 Quintana
(Continued)

FOREIGN PATENT DOCUMENTS

DE 202016100802 U1 5/2016
EP 1280705 B1 9/2006
(Continued)

OTHER PUBLICATIONS

International Search Report dated Dec. 6, 2018 filed in PCT/EP2018/073432.
(Continued)

*Primary Examiner* — Michael N Orlando
*Assistant Examiner* — Joshel Rivera
(74) *Attorney, Agent, or Firm* — Rankin, Hill & Clark LLP

(57) ABSTRACT

An apparatus and method for printing labels (1), in particular labels provided on a liner (2). The apparatus includes at least one label feed device (3) for providing and feeding labels, a transport device (4) including at least one transport element (9, 10) for transporting the labels, which have been fed by the label feed device, in a transport direction, a printing device (11) including a printing head (11*a*) for printing the labels transported by the transport device, and a capturing device (12) for capturing the position of the respective label in a section of the transport device. The capturing device has a line-scan or area-scan camera (13) with which the side of the transport element that faces the labels during correct use and/or a gap (19) formed between two transport element
(Continued)

Figure 1:
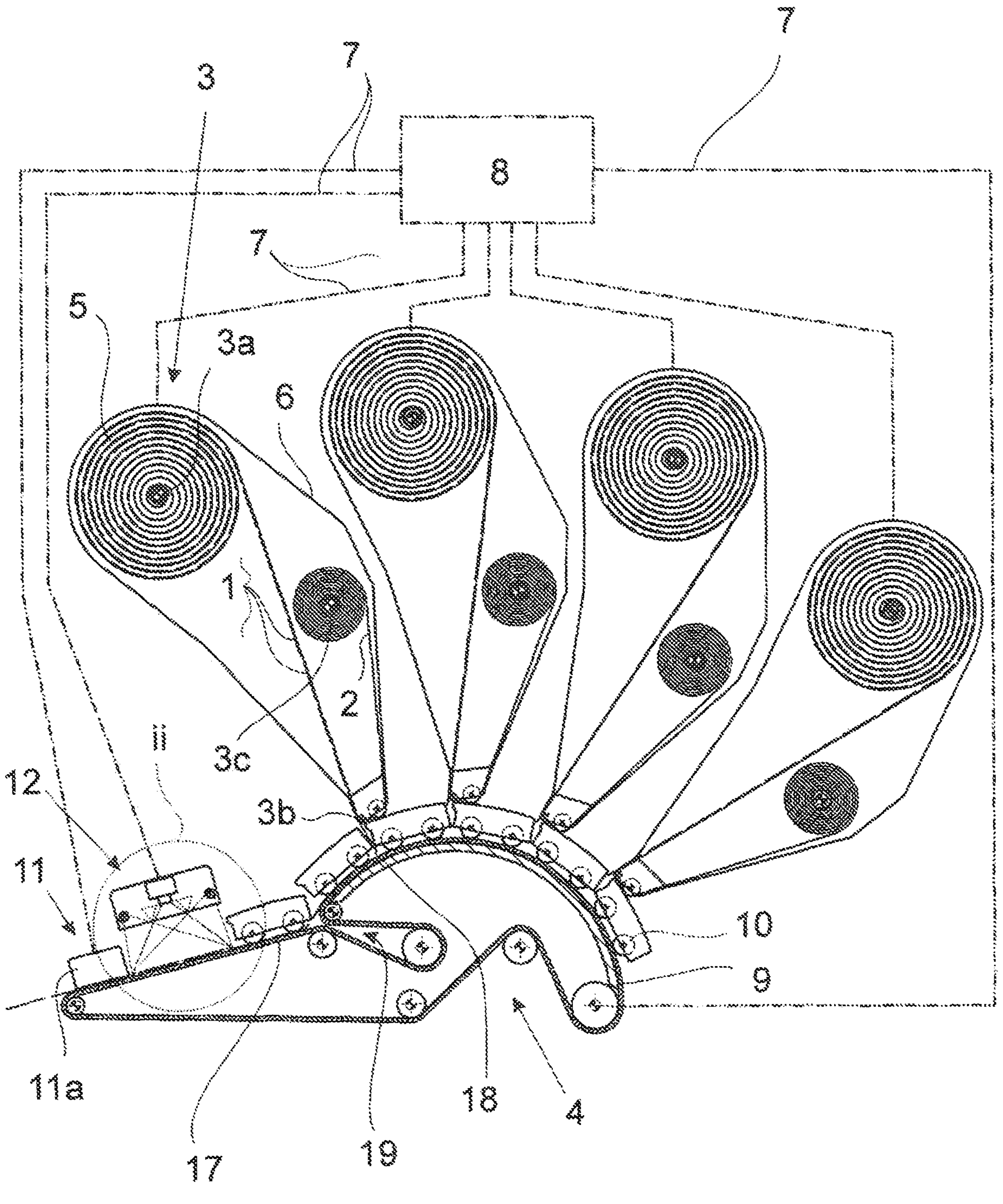

sections (17, 18) in the transport direction is optically capturable in a capturing region (14).

28 Claims, 2 Drawing Sheets

(51) Int. Cl.

| | |
|---|---|
| ***B41J 3/407*** | (2006.01) |
| ***B65C 9/18*** | (2006.01) |
| ***B65C 9/40*** | (2006.01) |
| ***B65C 9/46*** | (2006.01) |

(58) Field of Classification Search
USPC .................... 156/60, 64, 350, 351, 378, 379
See application file for complete search history.

(56) References Cited

U.S. PATENT DOCUMENTS

| | | | |
|---|---|---|---|
| 5,751,330 | A | 5/1998 | Austin et al. |
| 5,823,693 | A | 10/1998 | Henderson et al. |
| 7,270,410 | B2 | 9/2007 | Silverbrook |
| 8,596,840 | B2 | 12/2013 | Gold |
| 2003/0140804 | A1 | 7/2003 | Korthauer |
| 2006/0027304 | A1 | 2/2006 | Fujita |
| 2010/0089536 | A1 | 4/2010 | Austermeier |
| 2012/0067502 | A1 | 3/2012 | Piana et al. |
| 2017/0100949 | A1 * | 4/2017 | Celinder ................ B41J 3/4075 |

FOREIGN PATENT DOCUMENTS

| | | | |
|---|---|---|---|
| EP | 2174873 | A1 | 4/2010 |
| EP | 2364918 | A2 | 9/2011 |

OTHER PUBLICATIONS

User's Manual for TA200/TA210/TA300/TA310 Series Thermal Transfer/Direct Thermal BarCode Printer; 2011, TSC Auto ID Technology Co., Ltd., Taiwan; Cited in Eurasian Office Action.

"CCDs—general information" (web page) https://www.npk-photonica.ru/info/reading/18320/, Aug. 26, 2014, retrieved Jun. 16, 2022; Cited in Eurasian Office Action; English translation.

* cited by examiner

APPARATUS AND METHOD FOR PRINTING LABELS

The present invention relates to an apparatus for printing labels and to a method for printing labels.

Various methods for printing labels, in particular labels for goods, are known from the prior art. The labels are either self-adhesive labels arranged detachably on a liner or linerless labels that are provided in the form of an endless strand and are singulated by cutting. The labels and/or the liner can consist of paper or plastic. These types of labels, which are provided in particular in the form of rolled or accordion-style folded goods, are also part of the invention that will be described in detail below.

One known apparatus for printing labels (EP 1 280 705 B1), from which the invention proceeds, has a plurality of separate label feed devices for providing and feeding labels, wherein each of the label feed devices has a decoiler for unwinding a till roll composed of a liner and of the labels that are detachably provided thereon, a take-up spool for winding up the label-free liner, and a stripper head for deflecting the liner and thereby detaching the respective label from the liner. The label feed devices are all assigned to the same transport device, which, according to one embodiment, has a transport belt as the transport means. As soon as the label feed devices are respectively activated, they can feed labels to the transport device, which are then fed to a common printing device. After the labels have been printed in the printing device, they are applied each individually or in groups onto goods using an application device.

In the prior art mentioned, a capturing device for capturing the position of the respective label is provided upstream of the printing device, which has for example a thermal head, ink jet printing head or laser printing head as the printing head, in the transport direction. The capturing device is arranged in a gap between the transport belt and a roller forming a further transport means. Based on the captured label position, the printing head can place the respective print on the label and transfer the label correctly to the application apparatus.

Generally, color detection sensors producing a static, highly focused light beam are used for capturing labels on a transport device. When the light beam strikes a label being guided past, the light is reflected and the reflection is captured by the color detection sensor/luminescence switch. The color detection sensor thus operates according to the principle of a light barrier. When a label is captured by the light beam, a corresponding capture signal is generated by the color detection sensor, via which capture signal the printing head is controlled such that the print can be placed on the label provided.

A problem with the above-described prior art, however, is that the label is captured by the capturing device and a corresponding capture signal is generated even if the label is not optimally aligned with respect to the printing head. As a result, this frequently leads to a print not being optimally placed on the label, for example a print extending at an angle to the label edges or having an undesirable transverse or longitudinal offset and, in the worst case, even extending beyond label edges or a label pre-print.

The invention is based on the object of designing and developing the known apparatus for printing labels such that the respective label can be printed with greater precision.

The above object is achieved in respect of an apparatus for printing labels as disclosed and claimed herein.

Specifically, it is proposed that the capturing device has a line-scan or area-scan camera with which the side of the transport means that faces the labels during correct use, in particular the upper side of the transport means, and/or a gap formed between two transport means sections in the transport direction is optically capturable in a capturing region. The capturing region of the capturing device or of the camera is thus arranged and embodied such that the transport means and/or any transverse gap that may be present and consequently also the labels, which are transported by the transport means, possibly via the gap, through the capturing region, are captured.

The fundamental idea of using a camera, specifically a line-scan or area-scan camera, for capturing labels on the transport means, for example on the transport belt, rather than a color detection sensor that produces merely one individual, static light point, is crucial. A camera of this type has a significantly larger capturing region than a color detection sensor and thereby makes it possible in particular to capture a label across its entire width (extent transversely to the transport direction). In particular, a label can also be captured over its entire length (extent in the transport direction) both with a line-scan and an area-scan camera. In a line-scan camera, the capturing region is defined as one line, that is to say one-dimensional, and correspondingly has a defined width. In an area-scan camera, the capturing region is defined as an area, that is to say two-dimensional, and correspondingly has a defined length and width.

A line-scan or area-scan camera is additionally significantly more accurate than a color detection sensor. By contrast to a color detection sensor, which generates only the information relating to the mere presence or absence of a label on the transport means, a line-scan or area-scan camera can capture the entire label contour and can moreover also give information relating to the position and/or orientation of the respective label on the transport means. Such a camera can also be used to ascertain the respective label type, which in turn makes the use of a greater diversity of labels possible because a camera has a comparatively high contrast and can thus detect labels on a transport means even if the label has no, or only a minor, color difference with respect to the transport means surface. In principle it is even possible to capture transparent labels and/or the label thickness. A pre-print of the label can also be precisely detected. Using the information that is able to be generated via a camera, the respective label can be printed in a subsequent printing process with particular precision, that is to say the print can be placed optimally on the label, including for example exactly up to the edges or corners of the label or of a pre-print thereon. Reliable label identification is also possible, that is to say that the label that is captured in each case by the camera can be compared to a defined or stored specification (the "expected" label). Independently of this, a line-scan or area-scan camera is more cost-effective in terms of purchase than a color detection sensor and additionally easier to install, in particular because a camera is less sensitive to vibration.

On account of the line-shaped and thus relatively narrow capturing region, a line-scan camera additionally has the special advantage that it can capture labels even through a narrow gap between two transport means sections, in particular from below, thus offering more options for placing the camera.

According to one embodiment, the line-scan or area-scan camera is arranged vertically above the transport means, that is to say over the transport means in the direction of gravity. In this case, in particular the upper side of the transport means on which the labels lie faces the camera. In principle, however, other alignments or arrangements of the camera relative to the transport means and to the label transported thereby are also conceivable, provided it is ensured that the label can be captured as described. The line-scan or area-scan camera can thus also be arranged vertically below the transport means. In that case, the camera is directed in particular at or into a gap, which is located between two transport means sections that are adjacent in the transport direction and through which the labels pass as they are being transported. The respective transport means section is, for example, a constituent part of a transport belt or of a transport roller, that is to say the gap is then located between two transport belts or between two sections of the same transport belt or between two transport rollers or between a transport roller and a transport belt.

The line-scan or area-scan camera according to another embodiment is in particular a monochrome camera or a color camera. With particular preference, it is a plug-and-play camera, preferably a USB camera ("USB": Universal Serial Bus). A capturing device or camera that can be connected to the apparatus according to the proposal by means of "plug and play," that is to say merely by connecting it to a corresponding interface, in particular USB interface, can be installed particularly easily. In particular it does not require a separate power supply because, for example, a USB interface is suitable both for transmitting data and for supplying power.

In yet another embodiment, the capturing device has at least one light-emitting means that illuminates the capturing region at least in a section-wise manner, in particular completely. This makes it possible to capture a respective label and any pre-print on the label with particular precision.

Further preferred embodiments and arrangements of the capturing region are also disclosed and claimed. The latter is located in particular upstream of the printing head in the transport direction, wherein the capturing region can overlap with the printing region in the transport direction or can adjoin the printing region in the transport direction or can also be located at a distance from the printing region in the transport direction. The "printing region" is understood to mean the region of the transport belt in which the printing head can print. The label can then be printed and in particular be adapted within this printing region.

In accordance with another embodiment, a reference point and/or a reference line is provided via which the camera is able to be calibrated in the transport direction and/or transversely to the transport direction and/or perpendicular to the transport plane (with which the camera is able to be aligned). Said reference point or reference line can be formed by the printing head, in particular by the housing thereof or by distinctive points or edges thereof and can be located inside or outside the capturing region. For electronic calibration, the reference point or reference line preferably lies inside the capturing region, and, for mechanical calibration/alignment of the camera, the reference point or reference line can also lie outside the capturing region. A "reference point" is understood to mean a point that defines the zero point of an in particular Cartesian coordinate system (X-Y coordinate system or X-Y-Z coordinate system). A "reference line" in particular forms a corresponding coordinate axis.

In accordance with a preferred embodiment, a control device is provided. In a preferred design, the latter controls the printing process of a label based on a contour of said label, captured by the capturing device, and/or on a captured pre-print or contour of a pre-print. Additionally or alternatively, the control device can also be used to monitor slip, which will be explained below.

In particular, the printing process can be adapted automatically as soon as a label that has a different width, length, position and/or orientation than a specified target value for the width, length, position and/or orientation or that has a different width, length, position and/or orientation than the immediately preceding label passes through the capturing region. The "position" is understood to mean the position relative to the lateral delimitations of the transport means or relative to a longitudinal mark on the transport means, that is to say the position in the transverse direction, by way of which it is then also possible to ascertain a transverse offset between a specified target position and the actual label position (current position) or a transverse offset between two labels that are transported one after the other. The "orientation" is understood to mean an alignment of the respective label or of the direction of extent of the edges of the label with respect to the transport direction or with respect to the direction of extent of the lateral delimitations of the transport means or a longitudinal mark on the transport means, as a result of which an angular offset between a specified target orientation and the actual label orientation (current orientation) or an angular offset between two labels that are transported one behind the other can be ascertained. The printing process can here be controlled and/or adapted in particular such that the print reaches all the way to the contour (outer edges) of the label or to the pre-print.

In accordance with a further embodiment, the printing device has in particular a thermal head having a thermal strip as the printing head. However, it is also conceivable in principle to use a laser printing head or ink jet printing head.

The transport device in turn can have, as transport means, at least one transport belt, preferably exactly one transport belt or a plurality of transport belts, and/or at least one unit having one or more transport rollers and/or pressure rollers. "Transport rollers" are understood to mean rollers on which a label can be transported. "Pressure rollers" are rollers that press the label against another transport means, such as a transport belt or transport rollers, as it is being transported. The transport means can also have transport means sections that are directly adjacent to each other in the transport direction and between which said gap is formed in the transport direction, wherein the transport means sections can be part of a transport belt or of a unit of transport rollers.

In accordance with a particularly preferred embodiment, a plurality of label feed devices are provided which are configured in each case for providing and feeding labels and are assigned to the same transport device, the same capturing device and/or the same printing device. The label feed device or label feed devices used according to the proposal preferably has or have a decoiler, a stripper head, and a take-up spool. The decoiler serves for holding a till roll with a label strip, wherein the label strip is preferably a liner with labels that are detachably provided thereon. In principle, however, the label strip can also be a strip of material from which labels are formed by cutting the material strip to length. In the preferred case of a liner with labels that are detachably provided thereon, said labels are detached at the stripper head by strongly deflecting the liner, wherein the then label-free liner is wound up via the take-up spool. If a plurality of such label feed devices are provided, it is possible not only to feed different types of labels, but also for a label feed device to feed labels once the label supply of a previously active label feed device has been used up. It is advantageous to capture labels particularly precisely especially in the case in which the labels are fed to the same printing head via different label feed devices.

In accordance with another embodiment, which has a separate significance, a method for printing labels, in particular labels provided on a liner, is disclosed and claimed, wherein the labels are provided via at least one label feed device and are fed to a transport device that transports the labels in a transport direction past a capturing device to a printing device, in which the labels are printed. What is significant in the method, which can be performed by using an apparatus as defined previously, is that the labels are optically captured in a capturing region of the capturing device by a line-scan or area-scan camera of the capturing device. The same advantages as described above in connection with the apparatus are obtained.

The invention will be explained in more detail below with reference to a drawing illustrating merely exemplary embodiments. In the drawing FIG. 1 shows a schematic view of an apparatus according to the proposal for printing labels, and FIG. 2 shows the detail ii from FIG. 1 a) in an enlarged illustration, and b) in a plan view.

Figure 2:
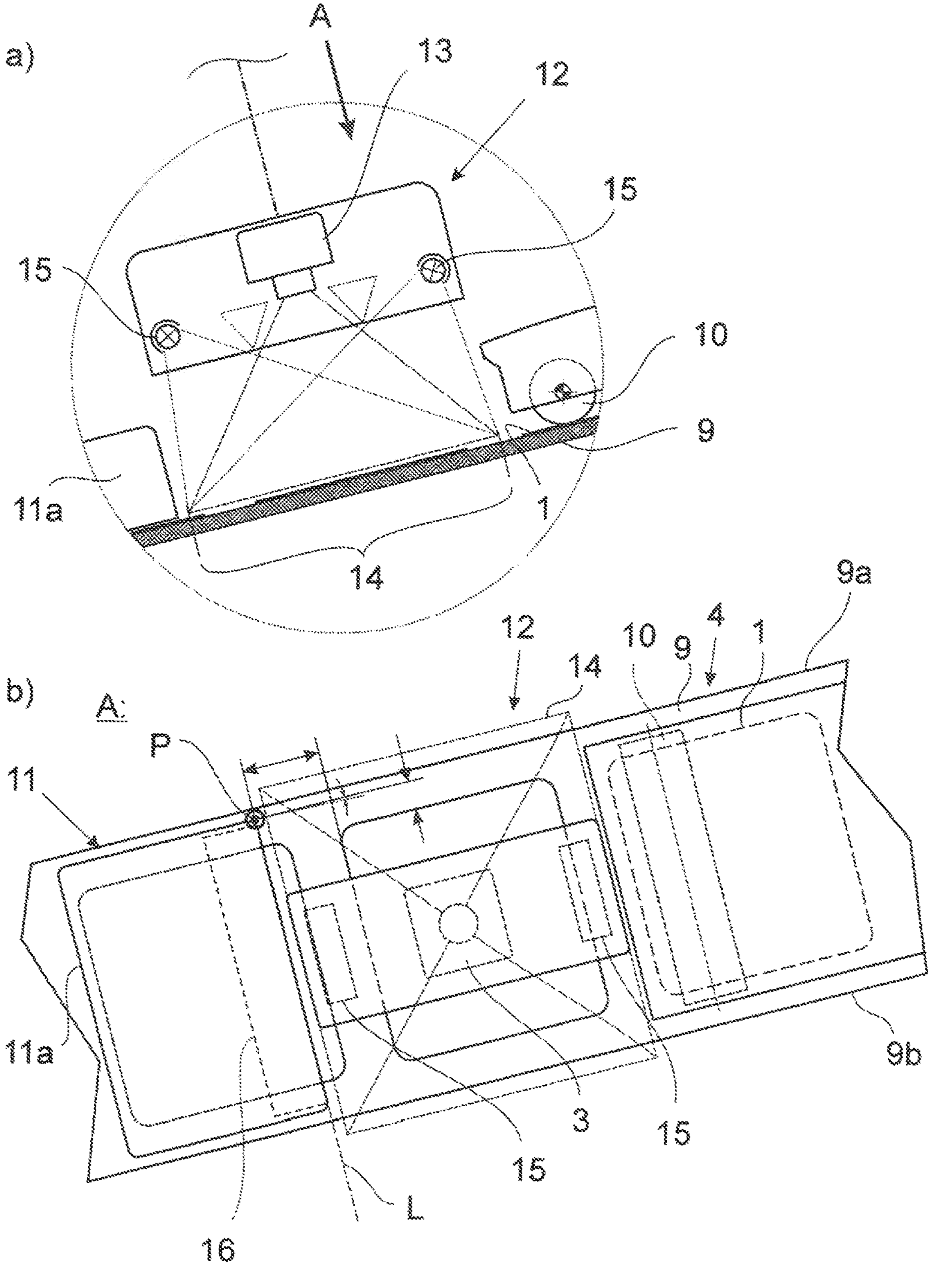

FIG. 1 shows, by way of example and purely schematically, an apparatus according to the proposal for printing labels 1, in particular adhesive labels 1, which are provided here detachably on a liner 2. The apparatus has a plurality of separate label feed devices 3 via which the individual labels 1 are provided and fed to a transport device 4.

Each of the label feed devices 3 is here constructed according to the same principle. The label feed devices 3 thus have a decoiler 3*a*, a stripper head 3*b*, and a take-up spool 3*c*. The decoiler 3*a* serves for holding a till roll 5, which here comprises a liner 2 to be unwound having labels 1 that are detachably provided thereon. The liner 2, on which the labels 1 are arranged, is guided from the decoiler 3*a* to the stripper head 3*b*, at which the liner 2 is strongly deflected, here for example by more than 90°, as a result of which the labels 1 automatically detach in each case from the liner 2. The liner 2, which has now rid itself of the labels 1, is finally wound up again by the take-up spool 3*c*.

The individual constituent parts of the label feed device 3, in particular decoiler 3*a*, stripper head 3*b*, and take-up spool 3*c*, are arranged here in a cartridge 6, which is capable of being removed from the apparatus and/or replaced in its entirety.

As shown in FIG. 1, the label feed device 3 and/or the decoiler 3*a*, the stripper head 3*b* and/or the take-up spool 3*c* is/are connected to a control device 8 of the apparatus via an assigned control line 7, as will be explained in more detail below. Thereby, each individual one of the label feed devices 3 can be activated or deactivated, as required. "Activate" is understood to mean that the label feed device 3 is positioned and/or controlled such that individual labels 1 can be fed to the transport device 4. It is conceivable that the remaining label feed devices 3 are deactivated in that case, that is to say do not feed any labels 1 themselves. However, it is also conceivable that further ones of the label feed devices are likewise activated and feed labels 1 at the same time.

The transport device 4 comprises at least one transport means 9, 10 with which the labels 1, which have been fed by the respective label feed device 3, are transported in a transport direction. One of the transport means is here a transport belt 9 that cooperates with another transport means in the form of a unit made from a plurality of pressure rollers 10. The transport belt 9 has a drive, which is likewise coupled to the control device 8. The unit made of pressure rollers 10 serves for pressing the labels 1 against the surface of the transport belt 9 as they are being transported so that they remain positioned and aligned on the transport belt 9 as optimally as possible. The transport belt 9 here has two transport means sections 17, 18, one of which is curved and the other is straight. A gap 19, across which the respective label 1 is conveyed from the curved to the straight transport means section, is formed between them.

The transport device 4 transports the individual labels 1, in particular continuously, in the transport direction to a printing device 11 having a printing head 11*a* configured for printing the labels 1 that are transported by the transport device 4. The printing device 11 is also connected to the control device 8 via a separate control line 7. The printing head 11*a* in the exemplary embodiment described here is a thermal head having a thermal strip. In this way, a thermally sensitive medium can be changed in terms of color, in particular blackened, by way of a point-type introduction of heat. The corresponding printing method, known as thermal printing, can be direct thermal printing, thermal transfer printing or thermal sublimation printing. However, the solution according to the proposal in principle also encompasses other printing methods, for example laser printing methods or ink jet printing methods. Accordingly, it is also possible for a laser printing head or an ink jet printing head to be provided as the printing head.

It is now possible to feed individual labels from each of the label feed devices 3 to said printing device 11 by means of the transport device 4, wherein the labels 1 are guided past a capturing device 12 for capturing the position and orientation of the respective label 1 in a section of the transport device 4 before they reach the printing device 11. The label feed devices 3, which are able to be activated independently of one another and here can also provide different labels, are thus assigned, in the exemplary embodiment described here, to the same transport device 4, the same printing device 11 and the same capturing device 12.

What is important is now that the capturing device 12 has a line-scan or area-scan camera 13 with which the side of the transport belt 9 facing the transported labels 1, here the upper side of the transport belt 9, is optically capturable in a capturing region 14. Accordingly, when a label 1 passes through the capturing region 14, the respective label 1 is captured. This is illustrated in detail in FIGS. 2*a* and *b*.

The capturing device 12 is also connected to the control device 8 via a separate control line 7. In this way, data, generated by the capturing device 12, relating to the width, length, position and/or orientation of the label 1 that respectively passes through the capturing region 14 can be processed by the control device 8, which uses said data to control the printing head 11*a* such that a print can be placed optimally and with great precision on the respective label 1. It is thus possible to identify the geometry even of complex labels 1 using a line-scan or area-scan camera 13 and to correspondingly adapt an assigned printing process. Since the width of the capturing region 14 can be chosen to be at least such that a label 1 can be captured in its entirety in the transverse direction (transverse to the transport direction) and can preferably also be captured in its entirety in the longitudinal direction or transport direction, it is possible in particular to also detect the position or the transverse offset of a label and/or the orientation or an angular offset of the label 1 and to correspondingly control or adapt a printing process that is assigned to the respective label 1. A further advantage of the comparatively large capturing region 14 is that a capturing device 12 or a corresponding camera 13 can be aligned particularly easily with respect to the respective transport means, in the present case the individual transport belt 9. By contrast, this is more difficult in the prior art, in which a color detection sensor is used.

Since the label 1 can be captured in its entirety, which is also possible using a line-scan camera 13 if the individual captured lines are combined into a two-dimensional image, the respective label 1 can be printed if required even up to its edges, that is to say to its outer contour, and in particular also up to its corners. Even in the case in which the label 1 that is fed to the capturing region 14 and, in the further continuation, to the printing device 11 already has a pre-print, it is also possible to place a print with particular precision relative to the pre-print by capturing the pre-print or the contour of the pre-print.

Using the apparatus according to the proposal and in particular using the capturing device 12 provided, the printing process can also be adapted from one label to the respectively next label. In other words, adaptation of the printing process is possible within the time period from capturing the contour of the label 1 to the start of the printing process assigned to the label 1. If an immediately following label 1 having a different position or orientation subsequently reaches the capturing region 14, the printing process assigned to said label 1 can be immediately adapted for said subsequent label 1. It is also possible to automatically check before printing whether the correct label format for the respective product ID is being fed or is placed into the corresponding cartridge 6.

By coupling the control device 8 to the drive of the transport belt 9 and also to the capturing device 12, it is also possible to implement slip monitoring, in particular such that the capturing device 12 captures marks provided on the respective transport means 9 via which the control device 8 can ascertain the actual speed of the transport means 9 and which it can then compare to the captured actual rotational speed of the drive of the transport belt 9. A difference between the ascertained actual speed of the transport means 9 and the captured actual rotational speed of the drive of the transport belt 9 then indicates slip and can be indicated in particular to an operator and/or be automatically corrected.

Further details of the capturing device 12 of the apparatus according to the proposal for printing labels 1 will be described below with reference to FIGS. 2*a* and *b*.

The line-scan or area-scan camera 13 according to the exemplary embodiment is thus a color camera. The use of a monochrome camera is in principle however also conceivable. The entire capturing device 12 and thus also the camera 13 is connected to the remaining apparatus and in particular to the control device 8 via a plug-and-play interface, in particular a USB interface, that is to say an interface that permits the transmission of data and the supply of power to the camera 13. The supply of separate light-emitting means 15 of the capturing device 12 with power is also possible thereby, with said light-emitting means 15 illuminating the capturing region 14 at least in a section-wise manner, in particular completely. In the case illustrated here, the totality of the camera 13 and the light-emitting means 15 is connected to the apparatus or the control device 8 by means of the plug-and-play interface or USB interface in the manner described.

As is illustrated in FIG. 2*a*, the capturing device 12 or the line-scan or area-scan camera 13 is arranged vertically above the transport means 9, at least vertically above the capturing region 14. The capturing device 12, in particular the line-scan or area-scan camera 13 and/or the light-emitting means 15, is or are directed here perpendicularly at the surface of the transport means 9 in the capturing region 14. In principle, however, it is also conceivable to direct the capturing device 12 or the camera 13 and/or the light-emitting means 15 onto the surface at an angle. It is also possible for a capturing device 12, in particular a line-scan camera 13, to be arranged below the transport means 9 and/or be directed at or into a gap 19 between two transport means sections 17, 18 in order to then capture the labels in particular from below when they pass the gap 19. It is only necessary to ensure that the capturing region 14 is aligned with the transport means or transport belt 9 such that at least the majority of a fed label 1, in particular all of it, can be captured transversely to the transport direction and preferably also in the transport direction. With preference, as illustrated in FIG. 2*b*, the capturing region 14 is even formed such that a label 1 is able to be arranged entirely, that is to say including over its entire length, in the capturing region 14.

In the exemplary embodiment described here, the capturing region 14 for this purpose has a length (extent in the transport direction) of at least 100 mm, preferably at least 150 mm, with particular preference at least 200 mm, and has in particular a length corresponding to at least one label length. Here, the capturing region furthermore has a width (extent transverse to the transport direction) of at least 50 mm, preferably at least 100 mm, with particular preference at least 150 mm, and has in particular a width corresponding to at least one label width. In the example illustrated in FIG. 2*b*, the capturing region 14 even extends laterally, i.e. in the transverse direction, beyond the transport means or transport belt 9. In principle, the capturing region 14 captures at least one of the lateral peripheries 9*a*, 9*b*, preferably both lateral peripheries 9*a*, 9*b* of the transport means or transport belt 9. "Lateral peripheries" within the meaning of the invention are understood to mean the peripheries delimiting the transport means 9, 10 in the transverse direction.

The capturing region 14, which is arranged upstream of the printing head 11*a* in the transport direction, is here located at a distance from the printing region 16, in which in principle printing can take place and which is defined here by the thermal strip, in the transport direction. The distance is preferably less than one label length. In particular, the distance is at most 100 mm, preferably at most 50 mm, with particular preference at most 20 mm. It is also conceivable in principle that the capturing region 14 adjoins the capturing region 16 in the transport direction or even overlaps the printing region 16 in the transport direction.

As FIG. 2*b* also schematically illustrates, the line-scan or area-scan camera 13 is calibrated or able to be calibrated with respect to a reference point P and/or a reference line L in the transport direction and/or transversely to the transport direction and/or perpendicularly to the transport plane or transport means surface. Here, the reference point P is a point, or the reference line L is a line, at the printing head 11*a*, wherein the reference point P and the reference line L are arranged here in each case outside the capturing region 14.

The present invention finally also relates to a method for printing labels 1, in particular labels 1 provided on a liner 2, which method is able to be carried out preferably using the apparatus described above.

In the method according to the proposal, the labels 1 are provided in each case via at least one label feed device 3 and fed to a transport device 4. The labels 1 are then transported by the transport device 4, as described above in detail, past a capturing device 12 to a printing device 11, in which the labels 1 are printed in each case. In particular, the printed labels 1 are subsequently applied in each case to goods. Provision is made according to the proposal for the labels 1 to be optically captured in a capturing region 14 by a line-scan or area-scan camera 13 of the capturing device 12.

The invention claimed is:

1. An apparatus for printing individual labels, the apparatus comprising:

a transport device;

a capturing device; and a printing device;

wherein the transport device is configured to transport individual labels in a transport direction, wherein the transport device has a first transport section and a second transport section, wherein the second transport section is downstream of the first transport section in the transport direction, wherein the first transport section of the transport device comprises a transport belt having a surface for receiving a feed of the individual labels that have either been detached from a liner or have been singulated from a strand by cutting, wherein the capturing device comprises a line-scan or area-scan camera configured to optically capture a position and orientation of a respective one of the individual labels transported by the transport device in a capturing region located in the second transport section of the transport device, wherein the printing device is located downstream in the transport direction of the capturing device, and wherein the printing device is configured to print the respective one of the individual labels in a printing region based on the position and orientation of the respective one of the individual labels captured in the capturing region by the capturing device.

2. The apparatus according to claim 1, wherein the second transport section comprises an additional transport belt.

3. The apparatus according to claim 2, wherein the line-scan or area-scan camera is arranged above the additional transport belt.

4. The apparatus according to claim 2, wherein a gap exists between the transport belt and the additional transport belt, and wherein the line-scan or area-scan camera is arranged to optically capture the position and orientation of the respective one of the individual labels in the gap from below.

5. The apparatus according to claim 1, wherein the second transport section comprises the same transport belt as the first transport section.

6. The apparatus according to claim 5, wherein the line-scan or area-scan camera is arranged above the transport belt.

7. The apparatus according to claim 5, wherein the transport belt is arranged such that a gap exists between the first transport section and the second transport section, and wherein the line-scan or area-scan camera is arranged to optically capture the position and orientation of the respective one of the individual labels in the gap from below.

8. The apparatus according to claim 1, wherein the line-scan or area-scan camera is a color camera.

9. The apparatus according to claim 1, wherein the capturing device has at least one light-emitting element for illuminating at least a portion of the capturing region.

10. The apparatus according to claim 1, wherein the capturing region overlaps the printing region.

11. The apparatus according to claim 1, wherein the capturing region adjoins the printing region.

12. The apparatus according to claim 1, wherein the capturing region is located a distance of 100 mm or less from the printing region.

13. The apparatus according to claim 1, wherein the capturing region has a length of at least 100 mm or the capturing region has a width of at least 50 mm.

14. The apparatus according to claim 3, wherein the capturing device is configured to also capture one or both lateral peripheries of the additional transport belt.

15. The apparatus according to claim 6, wherein the capturing device is configured to also capture one or both lateral peripheries of the transport belt.

16. The apparatus according to claim 3, wherein the line-scan or area-scan camera is configured to be calibrated with respect to a reference point or with respect to a reference line extending in the transport direction or a reference line extending transverse to the transport direction or with respect to a reference line extending perpendicularly to a plane of the additional transport belt.

17. The apparatus according to claim 6, wherein the line-scan or area-scan camera is configured to be calibrated with respect to a reference point or with respect to a reference line extending in the transport direction or a reference line extending transverse to the transport direction or with respect to a reference line extending perpendicularly to a plane of the transport belt.

18. The apparatus according to claim 1, further comprising a control device configured to control, based on a contour of the respective one of the labels captured by the capturing device or based on a pre-print or a contour of a pre-print on the respective one of the labels captured by the capturing device, an assigned printing process.

19. The according to claim 3, further comprising a control device configured to monitor or indicate or adjust slip of the additional transport belt element based on marks on the additional transport belt captured by the capturing device.

20. The according to claim 6, further comprising a control device configured to monitor or indicate or adjust slip of the transport belt element based on marks on the transport belt captured by the capturing device.

21. The apparatus according to claim 18, wherein the control device is configured to automatically adapt the assigned printing process when it is determined that one or both of the position and orientation of the respective one of the individual labels transported by the transport device in the capturing region has:

a different width, length, position and/or orientation than a specified target value for the width, length, position and/or orientation; or a different width, length, position and/or orientation compared to an immediately preceding one of the individual labels in the capturing region.

22. The apparatus according to claim 21, wherein the control device is configured automatically adapt the assigned printing process within a time period from the capturing of the contour of the respective one of the labels by the capturing device and a start of the assigned printing process for the respective one of the individual labels.

23. The apparatus according to claim 22, wherein the control device is configured to adapt the assigned printing process such that the print reaches all the way to the contour of the respective one of the individual labels.

24. The apparatus according to claim 1, wherein the printing device has print head, and wherein the print head is one of a thermal head with a thermal strip, a laser printing head or an ink jet printing head.

25. The apparatus according to claim 1, wherein the transport device further comprises one or more transport rollers and/or pressure rollers.

26. The apparatus according to claim 1, further comprising a plurality of label feed devices configured in each case for providing and feeding labels to the surface of the transport belt.

27. The apparatus according to claim 26, wherein the plurality of label feed devices are independently activatable relative to one another to provide individual labels that are different from each other.

28. A method for printing labels comprising:

feeding individual labels that have either been detached from a liner or have been singulated from a strand by cutting to a surface of a transport belt of a first transport section of a transport device of an apparatus according to claim 1;

optically capturing the position and orientation of a respective one of the individual labels in the capturing region using the line-scan or area-scan camera; and printing the respective one of the individual labels in the printing region based on the position and orientation of the respective one of the individual labels captured in the capturing region.

* * * * *